(12) United States Patent
Vasseur et al.

(10) Patent No.: US 9,253,021 B2
(45) Date of Patent: Feb. 2, 2016

(54) HIERARCHICAL SCHEMA TO PROVIDE AN AGGREGATED VIEW OF DEVICE CAPABILITIES IN A NETWORK

(75) Inventors: Jean-Philippe Vasseur, Saint Martin d'Uriage (FR); Gilman Tolle, San Francisco, CA (US); Sumit Rangwala, Fremont, CA (US); Philip Buonadonna, San Francisco, CA (US)

(73) Assignee: Cisco Technology, Inc., San Jose, CA (US)

(*) Notice: Subject to any disclaimer, the term of this patent is extended or adjusted under 35 U.S.C. 154(b) by 269 days.

(21) Appl. No.: 13/407,243

(22) Filed: Feb. 28, 2012

(65) Prior Publication Data
US 2013/0227114 A1    Aug. 29, 2013

(51) Int. Cl.
| | |
|---|---|
| G06F 15/173 | (2006.01) |
| H04L 12/24 | (2006.01) |
| H04L 12/26 | (2006.01) |
| H04W 24/00 | (2009.01) |
| G06F 11/00 | (2006.01) |

(52) U.S. Cl.
CPC .......... *H04L 41/044* (2013.01); *H04L 41/0896* (2013.01); *H04L 43/045* (2013.01)

(58) Field of Classification Search
CPC .... H04L 41/44; H04L 41/0896; H04L 43/045
See application file for complete search history.

(56) References Cited

U.S. PATENT DOCUMENTS

| | | |
|---|---|---|
| 6,539,340 B1 | 3/2003 | Robins et al. |
| 7,076,543 B1 | 7/2006 | Kirti et al. |
| 7,184,777 B2 * | 2/2007 | Diener et al. ............. 455/456.1 |
| 2009/0085769 A1 | 4/2009 | Thubert et al. |
| 2009/0180380 A1 | 7/2009 | Prabhakar et al. |
| 2009/0219901 A1 * | 9/2009 | Bull et al. ..................... 370/338 |
| 2011/0151886 A1 | 6/2011 | Grayson et al. |
| 2012/0005367 A1 | 1/2012 | Bettink et al. |
| 2012/0026938 A1 | 2/2012 | Pandey et al. |
| 2013/0188515 A1 * | 7/2013 | Pinheiro et al. ............... 370/254 |

FOREIGN PATENT DOCUMENTS

| | | |
|---|---|---|
| WO | WO-2006063118 A2 | 6/2006 |
| WO | WO-2007121206 A2 | 10/2007 |

OTHER PUBLICATIONS

Shelby et al., "Constrained Application Protocol (CoAP)", draft-ietf-core-coap-07, IETF CoRE Working Group Internet-Draft, Jul. 8, 2011, 87 pages.
Winter, et al., "RPL: IPv6 Routing Protocol for Low Power and Lossy Networks", draft-ietf-roll-rpl-19, IETF Internet-Draft; Mar. 2011, 164 pages.

* cited by examiner

*Primary Examiner* — Wen-Tai Lin
(74) *Attorney, Agent, or Firm* — Parker Ibrahim & Berg LLC; James M. Behmke; Stephen D. LeBarron

(57) ABSTRACT

In one embodiment, an aggregation device within a computer network domain receives one or more capability messages from one or more devices in the computer network domain. The aggregation device may then aggregate device capabilities from the capability messages, and provides the aggregated device capabilities to a management device located outside of the computer network domain.

18 Claims, 13 Drawing Sheets

| CAPABILITY 510 | AVAILABILITY 520 | NUMBER 522 | IDENTITIES 524 | LOCATION(S) 526 | COVERAGE 528 |
|---|---|---|---|---|---|
| CAP. 1 | Y | 30 | 11, 12, 21, 23 … | COORDINATES 1, 2, 3 … | 90% |
| CAP. 2 | N | 0 | -- | -- | -- |
| CAP. 3 | Y | 22 | 13, 32, 41 … | COORDINATES 4, 5 … | 50% |
| CAP. 4 | N | 0 | -- | -- | -- |
| CAP. 5 | N | 0 | -- | -- | -- |
| … | … | … | … | … | … |

TABLE 500

FIG. 5

HIERARCHICAL SCHEMA TO PROVIDE AN AGGREGATED VIEW OF DEVICE CAPABILITIES IN A NETWORK

TECHNICAL FIELD

The present disclosure relates generally to computer networks, and, more particularly, to relaying device capabilities in computer networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. A primary challenge is to make effective use of the limited and dynamic network capacity. In particular, the link between a centralized network management system and the LLNs or many other types of network domains are often constrained as well.

Various protocols have been specified for the discovery of devices in a network along with their capabilities. For example, after joining a network domain, a device may register itself (its identification, capabilities, etc.) with the centralized management system using end-to-end communication, and may periodically send updates to any initial information sent. With the potentially large number of network devices within a network domain (such as an LLN), the amount of traffic over the constrained link between the network management system and the domain could reach a problematic magnitude. That is, since the traffic is end-to-end, this may generate heavy traffic closer to the constrained link, in addition to the link itself.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5 illustrates an example aggregation table.

DESCRIPTION OF EXAMPLE EMBODIMENTS

Overview

According to one or more embodiments of the disclosure, an aggregation device within a computer network domain receives one or more capability messages from one or more devices in the computer network domain. The aggregation device may then aggregate device capabilities from the capability messages, and provides the aggregated device capabilities to a management device located outside of the computer network domain.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), wireless PANs (WPANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

Figure 1:
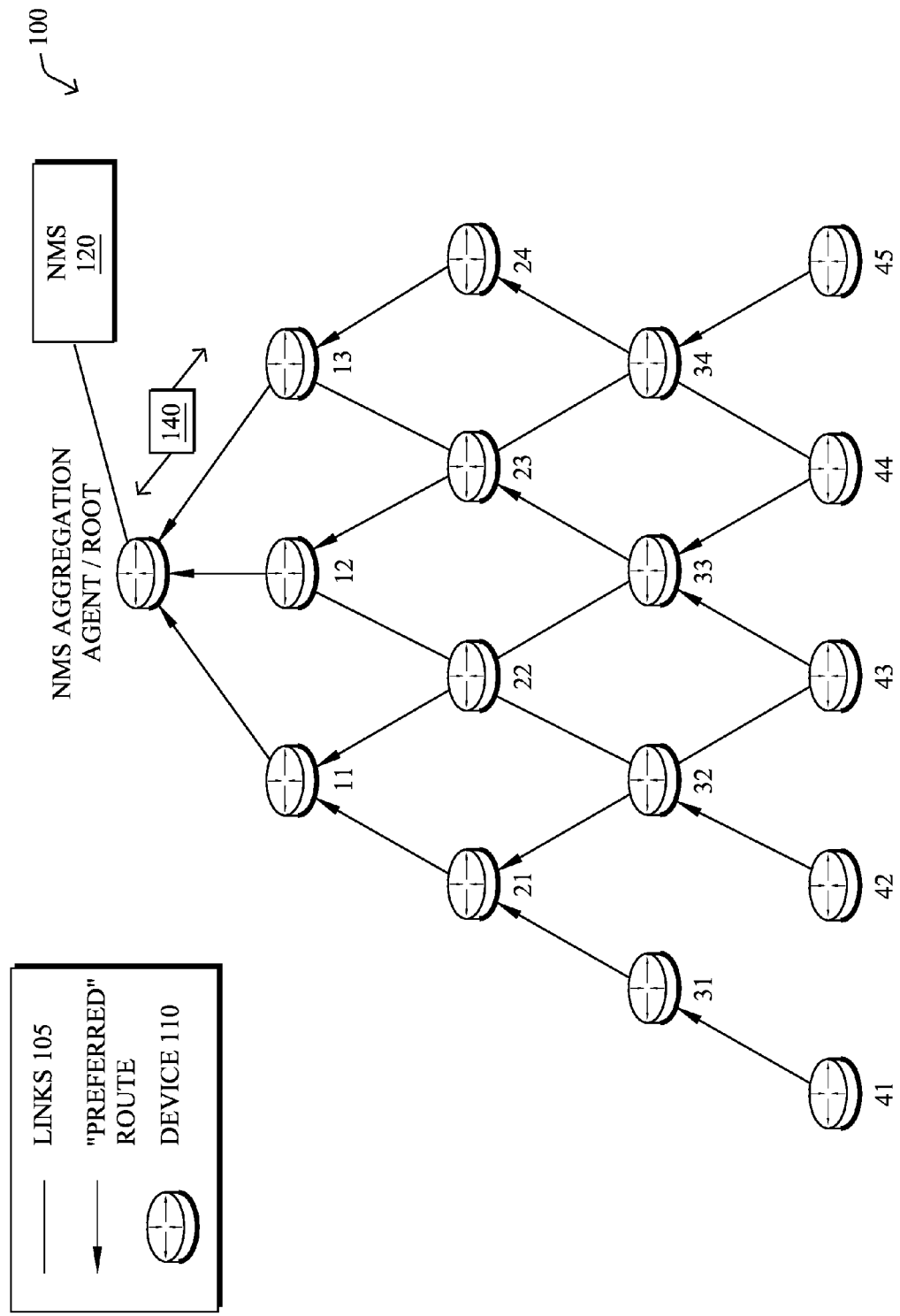
FIG. 1 illustrates an example computer network.

FIG. 1 is a schematic block diagram of an example computer network 100 illustratively comprising nodes/devices 110 (e.g., labeled as shown, "root," "11," "12," . . . "45", and described in FIG. 2 below) interconnected by various methods of communication. For instance, the links 105 may be wired links and/or shared media (e.g., wireless links, PLC links, etc.), where certain nodes 110, such as, e.g., routers, sensors, computers, etc., may be in communication with other nodes 110, e.g., based on distance, signal strength, current operational status, location, etc. In addition, a centralized controller/device, such as a network management service (NMS) device 120, may be in communication with the network 100, such as through the root node. Those skilled in the art will understand that any number of nodes, devices, links, etc. may be used in the computer network, and that the view shown herein is for simplicity.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
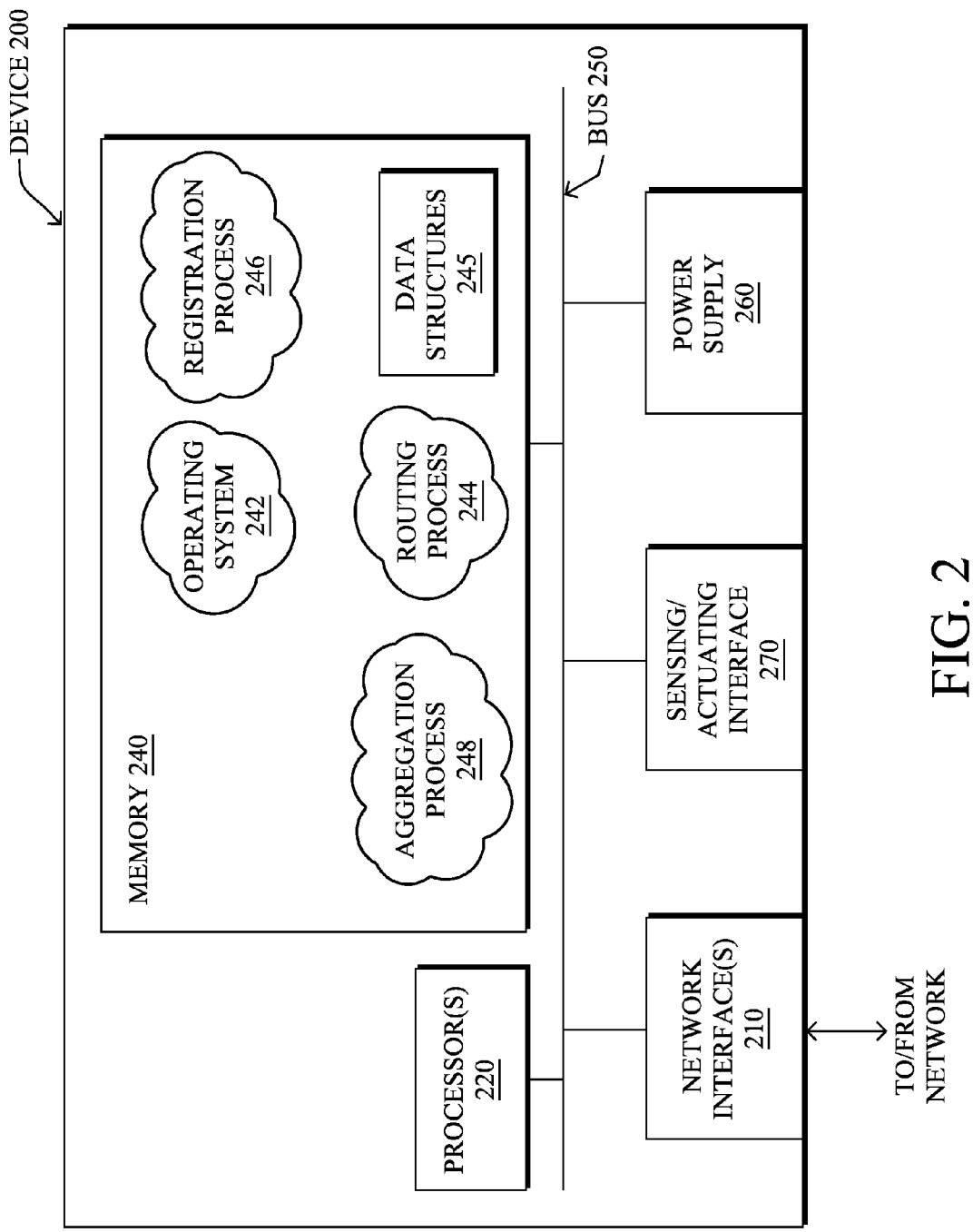
FIG. 2 illustrates an example network device/node.

FIG. 2 is a schematic block diagram of an example node/device 200 that may be used with one or more embodiments described herein, e.g., as any of the nodes shown in FIG. 1 above, such as devices 110 (particularly the root device in an illustrative embodiment) and the NMS 120. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.) and optionally a sensor/actuator interface 270 on certain devices (e.g., with mechanical/electrical circuitry to sense or actuate in a configured manner).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise (e.g., depending upon the configuration of the device) routing process/services 244, a registration process 246, and an illustrative aggregation process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Internet Draft, entitled "RPL: IPv6 Routing Protocol for Low Power and Lossy Networks"<draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by routing process 244 and/or a specific DAG process) based on an Objective Function (OF). The role of the Objective Function is generally to specify rules on how to build the DAG (e.g. number of parents, backup parents, etc.).

As an example, the network 100 depicted in FIG. 1 shows an LLN where paths have been computed using a routing protocol, where the arrows show preferred path/route. Note that while the arrows could be considered a DAG, no assumption is made herein on the nature of the underlying routing protocol.

As noted above, Smart Object devices typically operate unattended, that is, they generally discover and join a network, and then register and obtain network-layer information to effectively participate within the network. In a Smart Grid AMI deployment, for example, devices 110 will register themselves with a Network Management System (NMS) 120 to indicate their presence and obtain configuration information from the NMS. A myriad of protocols have been specified over the past few years that usually rely on IP multicast technologies for the discovery of devices in a network along with their capabilities, such as Simple Service Discovery Protocols (SSDP), Domain Name Server-Service Discovery (DNS-SD), etc.

In constrained environments such as the Internet of Things (IoT)/LLNs, however, all service discovery protocols relying on multicast approaches are ill-suited since they generate a significant amount of traffic in the network making the discovery process too bandwidth-consuming for these networks. Various other protocols, such as that described in the IETF Internet Draft entitled "Constrained Application Protocol (CoAP)"<draft-ietf-core-coap-07>, by Shelby et al. (Jul. 8, 2011 edition), may be used to provide an end-to-end (e.g., IPv6) solution (devices 110 to NMS 120) so as to limit the traffic in the LLNs (or other suitable computer network domains). CoAP, in particular, is an example peer-to-peer protocol for resource exchange, where operations are HTTP-style: GET, POST, and others. Within CoAP, message exchanges may be CON-firmable requests, ACK-nowledgements to confirmable requests, and NON-confirmable requests.

In an illustrative current implementation, a CoAP Simple Management Protocol (CSMP) uses CoAP to register a device 110 with a remote network management system (NMS 120) after joining the network. The device may generally obtains the address of the NMS using the known Dynamic Host Configuration Protocol (DHCP), and then makes a series of CoAP resource POSTs to that NMS to register its unique identifier, hardware description, interface description, and other key system parameters. The device then periodically posts changing information and metrics to the NMS, and awaits unicast and multicast commands from the NMS.

The CSMP implementation defines a set of resources that can be roughly grouped into five areas: information/metrics, configuration, commands, event, and scoping, as follows:

Information resources are sent from the device to the NMS. Some may be sent once at registration time, such as if they aren't going to change between restarts of the device. Others may be sent periodically, such as if they contain metrics that change over time. For example, a "ReportSubscribe" configuration resource tells the device which resources should be sent periodically.

Configuration resources are downloaded by the device from the NMS after registration. They can also be sent from the NMS to the device on-demand, either through unicast or multicast.

Command resources are sent from the NMS to the device, either through unicast or multicast. Each command resource has a corresponding command response resource, which can be sent back to the NMS asynchronously at a later time, or it can be contained directly in the CoAP response.

Event resources are sent from the device to the NMS on-demand. Note that these are used sparingly, if at all, to avoid bursty network traffic during error conditions. Event resources may also be logged and retrieved.

Scoping resources are included in a CoAP message, and affect the processing of other resources in the message.

In general, the information resources are:

TlvIndex—a list of other resources supported on the device, for service discovery.

DeviceID—a namespace identifier and a unique string representing the device within that namespace.

HardwareDesc—a set of properties describing the hardware of the device: description, vendor type, name, hardware revision, firmware revision, serial number, manufacturer name, model name, asset ID, manufactured date. This resource can be repeated with an index, for devices that contain separate sub-devices.

InterfaceDesc—a set of properties describing a network interface on the device: name, description, type, MTU, physical address. This resource can also be repeated with an index, for devices that contain multiple network interfaces.

IPAddress—a set of properties describing an IP address present on the device: address type, address, interface, origin, status, created date, last changed date. This resource can be repeated, for devices with multiple IP addresses.

IPRoute—a set of properties describing an IP route present on the device: destination address type, destination address, prefix length, next hop address type, next hop address, interface, type, routing protocol, and age. This resource can be repeated, for devices with multiple IP routes in the routing table.

CurrentTime—a property that contains the current time on the device.

Uptime—the current uptime of the device.

InterfaceMetrics—a set of metrics for an interface, including status, speed, byte counters, and error counters.

InterfaceDetailMetrics—additional metrics for an interface, broken down by unicast/multicast status.

UDPMetrics—a set of metric counters for the UDP protocol stack on a device.

IPRouteRPLMetrics—a set of metrics for a RPL route that lies behind a concrete IP route: instance, rank, hop count, path cost, link cost, rssi, lqi.

RPLInstance—a set of properties describing a RPL instance present on the device: instance id, DODAG ID, DODAG version number, rank, parent count. Can be repeated.

RPLParent—a set of properties describing an entry in the RPL parent table: instance, IP route, local IPv6 address, global IPv6 address, DODAG version number, path cost, link cost, rssi, lqi, hops.

Neighbor802154G—a set of properties describing an entry in the 802.15.4G neighbor table: physical address, last changed, rssi.

GroupInfo—a set of properties identifying an application-layer group that the device belongs to. Can be repeated for multiple groups.

FirmwareImageInfo—a set of properties identifying a firmware image stored on the device: name, unique hash, version, image size, block size, bitmap of received blocks, running status, default status, required hardware ID.

HardwareInfo—a set of properties that describes the hardware in a way that can be matched against a correct firmware image.

In general, the configuration resources are:

InterfaceSettings—administrative settings (up/down) for an interface on the device.

WPANSettings—configuration parameters for a WPAN network interface: PAN ID, short address, broadcast slot size, broadcast period, neighbor probe rate, backoff timer. This can be repeated.

RPLSettings—configuration parameters for a RPL instance on an interface: enabled/disabled, min trickle timer, max trickle timer, record-route interval.

ReportSubscribe—a list of resources that should be periodically reported to the NMS, and a reporting period.

GroupAssign—an application-layer group to which the device should be a member.

In general, the command resources are:

EchoRequest/EchoResponse—send a string to the device and return it, for testing.

PingRequest/PingResponse—direct the node to execute an IP ping to another node, and return the response.

SilenceRequest—direct the node to stop reporting for a specified time.

GroupEvict—direct the device to leave a specified application-layer group.

TransferRequest/TransferResponse—direct the device to prepare for a firmware image download.

ImageBlock—direct the device to store a data block for a particular firmware image.

LoadRequest/LoadResponse—direct the device to reboot and load a particular firmware image at a particular time.

CancelLoadRequest/CancelLoadResponse—direct the device to not load a firmware image which has previously been scheduled for a load.

SetBackupRequest/SetBackupResponse—direct the device to set a particular firmware image as its trusted backup image.

In general, the event resources are:

SyslogEvent—a syslog entry, containing a facility, severity, timestamp, message type, and string message.

LogRecord—a logged data item, containing a record type, a timestamp, and a byte-string value.

In general, the scoping resources are:

SessionID—the NMS returns this to the device after initial registration, and the device includes it in all other messages to the NMS.

GroupMatch—if the device is a member of the application layer group, then process the rest of the CSMP resources in the message. Otherwise, ignore the message.

Signature—if the signature over the rest of the CSMP resources is valid and trusted by the device, then process the rest of the CSMP resources in the message. Otherwise, ignore the message.

SignatureValidity—represents the validity period for the Signature TLV. contained within the set of signed resources.

Notably, as will be understood by those skilled in the art, the typical CSMP registration message flow is:
1. —random backoff on trickle timer—
2. Device--> CON POST (device id)--> NMS
3. Device <--ACK POST (session id) <--NMS
4. Device--> CON POST (information resources)--> NMS
5. Device <--ACK POST (information) <--NMS
6. Device--> CON GET (configuration URI)--> NMS
7. Device <--ACK GET (configuration resources) <--NMS
8. Device--> NON POST (metrics resources)--> NMS
9. —repeat periodic metric POSTs—

The typical CSMP unicast resource retrieval flow is:
1. Device <--unicast CON GET (resource URIs) <--NMS
2. Device--> unicast ACK GET (resources)--> NMS The typical CSMP multicast resource retrieval flow is:
1. Device <--multicast NON GET (resource URIs) <--NMS
2. —random delay, optional response—
3. Device--> unicast NON GET (resources)--> NMS The CSMP unicast command message flow is:
1. Device <--unicast CON POST (command resources) <--NMS
2. Device--> unicast ACK POST (command response)--> NMS The CSMP multicast unicast command message flow is:
1. Device <--multicast NON POST (command resources) <--NMS
2. —random delay, optional response—
3. Device--> unicast NON POST (command resources) <--NMS A typical CSMP periodic metrics message in an illustrative system is about 200 bytes. The registration messages are of similar size or smaller, and have three round-trip exchanges. A typical CSMP agent on a device will initiate a registration exchange once when it boots, and will send a periodic metrics message once per hour, or less frequently depending on available bandwidth in the network.

With upwards of 5000 nodes in a WPAN subnet sending a 200-byte message once per hour, with no acknowledgements, the average aggregate one-way traffic rate between the LBR for that network domain (e.g., subnet) and the NMS should be around 277 bytes/sec, which assumes even spreading of the traffic. If the spreading is uneven, this traffic rate could be higher.

In addition, the typical random backoff for device registration spreads devices over a five-minute interval. If we assume that 5000 nodes power on, randomly back off, and register, spread over a five-minute interval, and each one exchanges about 1200 bytes of information during registration, a burst traffic rate of about 20 KBytes/sec may occur for those five minutes.

Further still, during a firmware download, each command and each block will be delivered to the subnet via multicast. This may generate a significant amount of traffic within the subnet for the duration of the multicast. However, the nodes do not immediately respond. Instead, they wait until their next scheduled report interval to send back status information about the firmware download progress. This status information adds about 100 bytes of additional traffic to each report.

Unfortunately, as noted above, since the traffic is end-to-end, this may generate heavy traffic closer to the LBR, but also between the LBR and the NMS 120, where bandwidth is also scarce, which may be a major issue in a number of deployments.

Hierarchical Capability Aggregation

The techniques herein propose a hierarchical model involving a distributed registry agent hosted at the edge of the network (typically on an LBR) that communicates with objects (devices 110) located in the network using a protocol such as CoAP and provides an aggregated view of device resources/capabilities to a central agent hosted by the NMS 120 or other applications in a data center. That is, the techniques herein describe a three-tier model for network management in capability registration enabled networks (e.g., CoAP-enabled LLNs), where nodes send various type of information to a more capable device such as an LBR hosting a distributed NMS agent that may perform data manipulation such as fusion, aggregation, building aggregated representation of sensed data, etc., and that may provide the filtered/compressed information to a central network management engine.

Specifically, according to one or more embodiments of the disclosure as described in detail below, an aggregation device within a computer network domain receives one or more capability messages from one or more devices in the computer network domain. The aggregation device may then aggregate device capabilities from the capability messages, and provides the aggregated device capabilities to a management device located outside of the computer network domain.

Illustratively, the techniques described herein may be performed by hardware, software, and/or firmware, such as in accordance with the registration process 246 on nodes 110 and NMS 120, as well as specifically in accordance with an aggregation process 248 (e.g., an NMS aggregation agent process), which may each contain computer executable instructions executed by the processor 220 to perform functions relating to the techniques described herein. For example, the registration techniques herein may be treated as extensions to conventional registration protocols, such as CoAP, and as such, may be processed by similar components understood in the art that execute those protocols, e.g., within registration process 246 on the devices 110 and NMS 120. In addition, as described herein, between the registration of devices 110 and NMS 120 is a specific aggregation device, such as an LBR, where aggregation process 248 is specifically executed to perform functions relating to the aggregation device's techniques herein (e.g., an "NMS aggregation agent" device or simply "agent" device).

Figure 3:
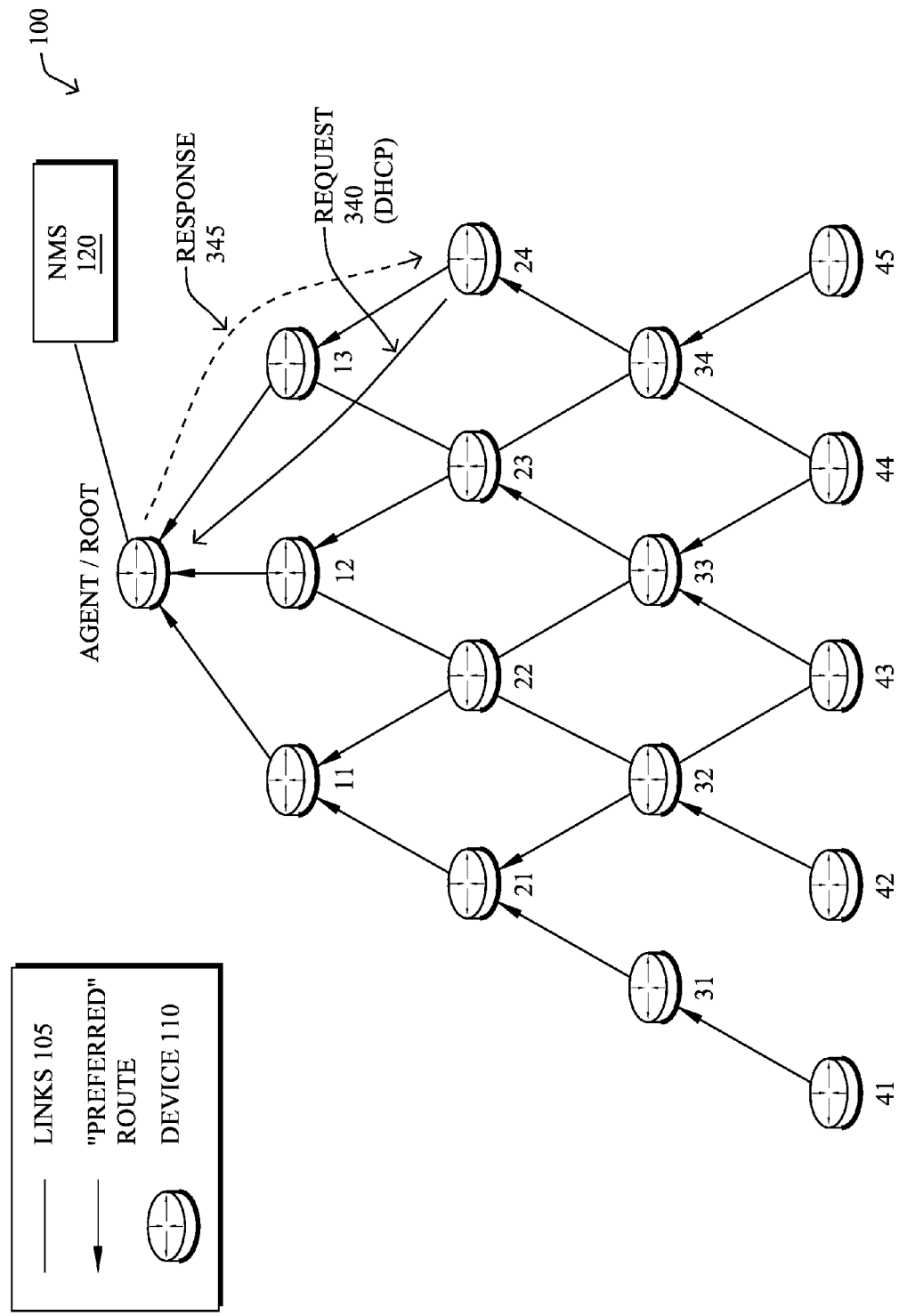
FIG. 3 illustrates an example request/response exchange.

Operationally, the techniques may first distribute an address of one or more aggregation devices (e.g., LBRs or other suitable agent devices), such as based on advertising the address within the network 100, or else using a request/response exchange. For example, as shown in FIG. 3, a dynamic host configuration protocol (DHCP) exchange, which generally already occurs when a device joins a network. That is, when a device 110 joins a network, it may send a DHCP request 340 to a DHCP server, which is often hosted by the root node/LBR, or some other dedicated device. The corresponding aggregation device agent(s) address(es) may thus be included within the resultant response 345. This allows a network administrator to direct the devices 110 either to a local registry (e.g., edge devices/LBRs) or a remote registry (e.g., NMS 120), as needed. Note that more than one remote address may be included so as to provide redundancy, particularly in environments where multiple LBRs are used to connect the LLN to the "classic" IP network (e.g., WAN to which the NMS 120 is connected).

Figure 4A:
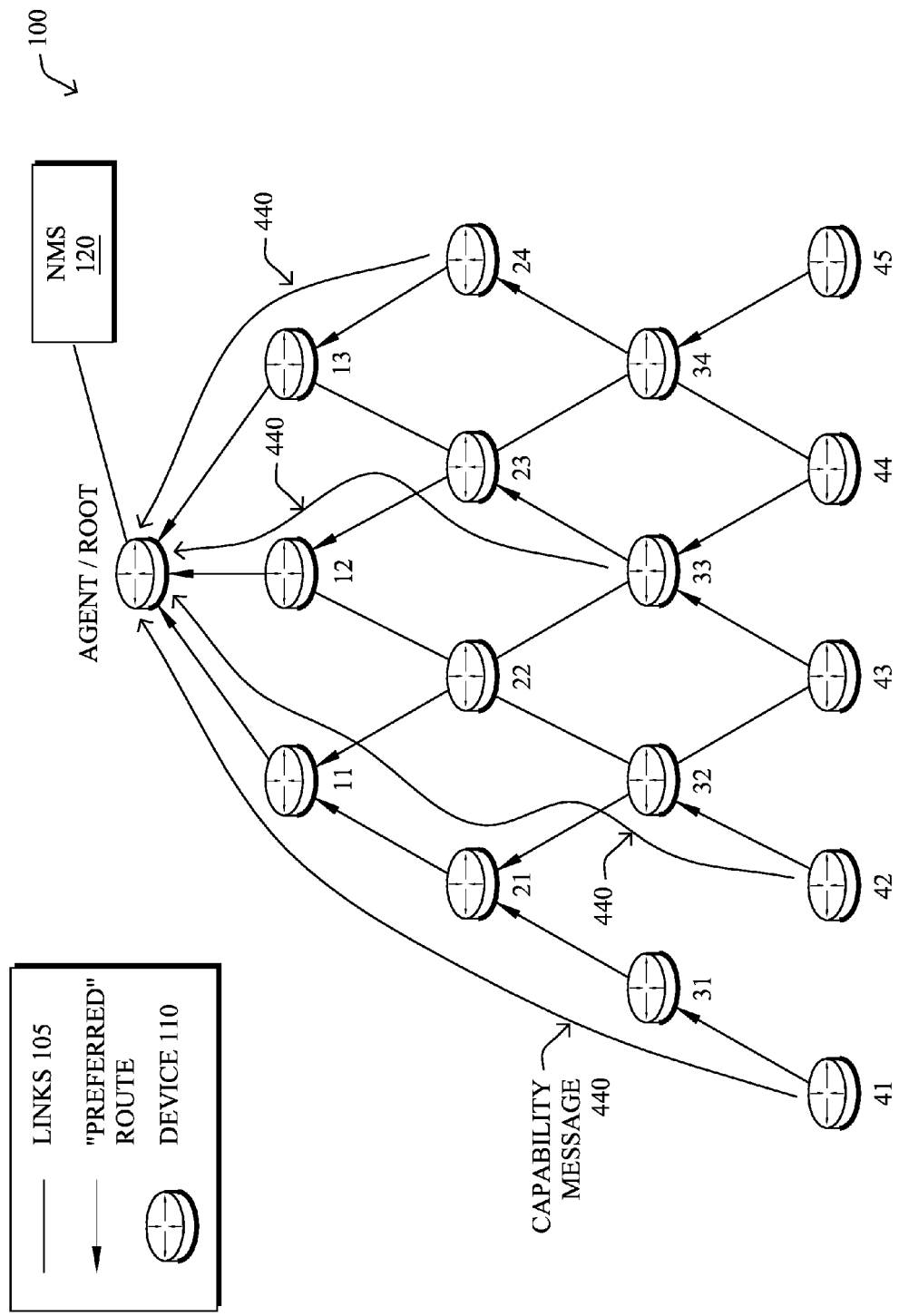
FIGS. 4A-4B illustrate example capability message exchanges.
Figure 4B:
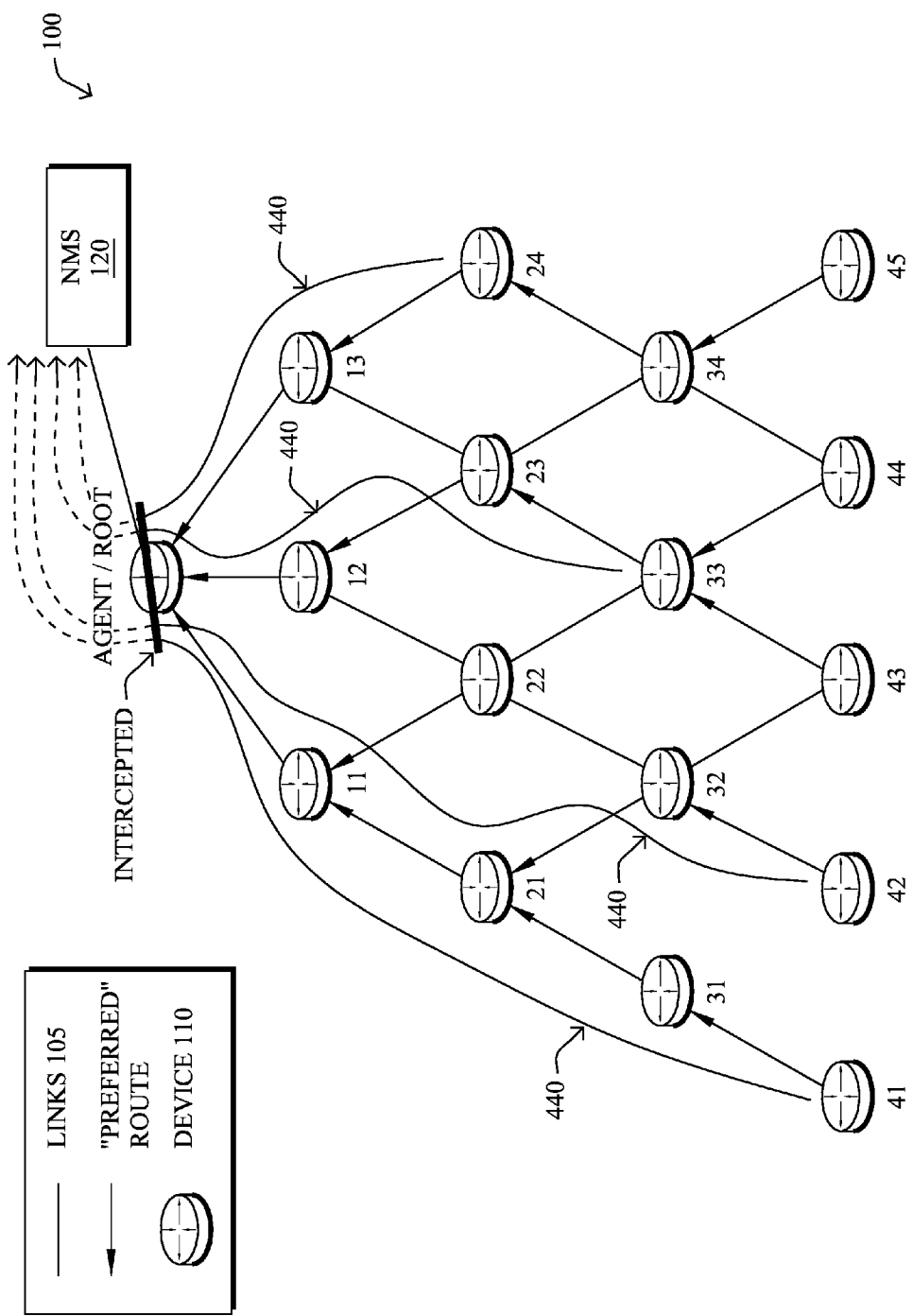

One or more (e.g., generally all) of the devices 110 of the network domain (e.g., LLN) may then provide a summary of their capability to the agent hosted on the edge router/LBR as an aggregation device, as opposed to sending it to the NMS 120. Illustratively, the capability messages may be transmitted using a unicast IPv6 message send to the aggregation device using the CoAP protocol. As shown in FIG. 4A, the capability messages 440 may be received from one or more devices in the computer network domain at an aggregation device (e.g., root) within the computer network domain. Alternatively, as shown in FIG. 4B, the one or more capability messages 440 may be destined for the management device (e.g., NMS 120), and may be "received" by the aggregation device by intercepting them on their way toward the management device. Note that capability messages may be sent using a random timer to avoid traffic congestion and collisions in the network, or when the network is determined to be a relatively idle state, etc.

In general, device capabilities may be relayed within messages 440 as information values that identifying various features, identifications, and functionality of the corresponding originating device. For instance, such information may include information resources as noted above (e.g., network capabilities), model and serial number, geographic location, hardware description, network interface description, sensing interface description, sensing data coverage area, etc. In particular, each resource carried over CoAP may illustratively be defined as an extensible set of key-value pairs representing properties of the device. Note that those shown and described herein are merely representative examples, and are not meant to limit the scope of the embodiments herein. Also note that while CoAP capabilities are described (e.g., the information resources above), other capabilities may also be relayed (and aggregated herein), such as sensing/actuating capabilities as well. As an example, a particular device may register its position (X,Y) and its capability (e.g., ability to sense temperature, pressure, etc., or an ability to control particular switches, valves, etc.). In addition, as described herein, it may be beneficial to also report the size of the sensed area (e.g., ability to sense temperature with a range of X meters).

According to the techniques herein, the aggregation device (e.g., the distributed CoAP agent hosted on the LBR, aggregation process 248) processes the received capability messages 440. Notably, this is in particular contrast with current models that would generate a significant amount of traffic between the LBR and the central agent/NMS 120. Specifically, the aggregation device aggregates device capabilities from the capability messages 440, illustratively creating an aggregated "view" of the network domain(s) (e.g., LLN domain(s)) for which it is responsible. Illustratively, the aggregated view herein may be in terms of capability and/or the physical coverage.

FIG. 5 illustrates an example aggregation-based table 500 (e.g., a data structure 245) that may be maintained by the aggregation device in accordance with one or more embodiments herein. In particular, the table 500 may comprise a plurality of entries corresponding to a particular capability 510, and one or more optionally configured aggregation fields 520-528.

For instance, in one embodiment, for each capability 510 (e.g., sensing capabilities such as temperature, vibration, etc.), the aggregation device may provide a simple aggregated view according to mere availability of the capability (field 520). For example, as shown, within the corresponding network domain, "capability 1" and "capability 3" are available ("Y"), thus indicating that the domain/LLN contains at least one device with those capabilities (e.g., that can sense temperature, vibration, etc.). In another similar embodiment, the table 500 may indicate an actual number (or a range/representation) of devices within the computer network domain that have a particular capability in field 522. In still a further embodiment, the actual identities of the devices may be maintained in field 524, which may be kept locally for tracking purposes, or, in a specific embodiment, may be sent to the NMS 120 in an aggregated report (described below). (Specifically, in this sense, the aggregation of the capability messages 440 may simply comprise sending a singular message to the NMS, rather than many individual messages.)

Figure 6A:
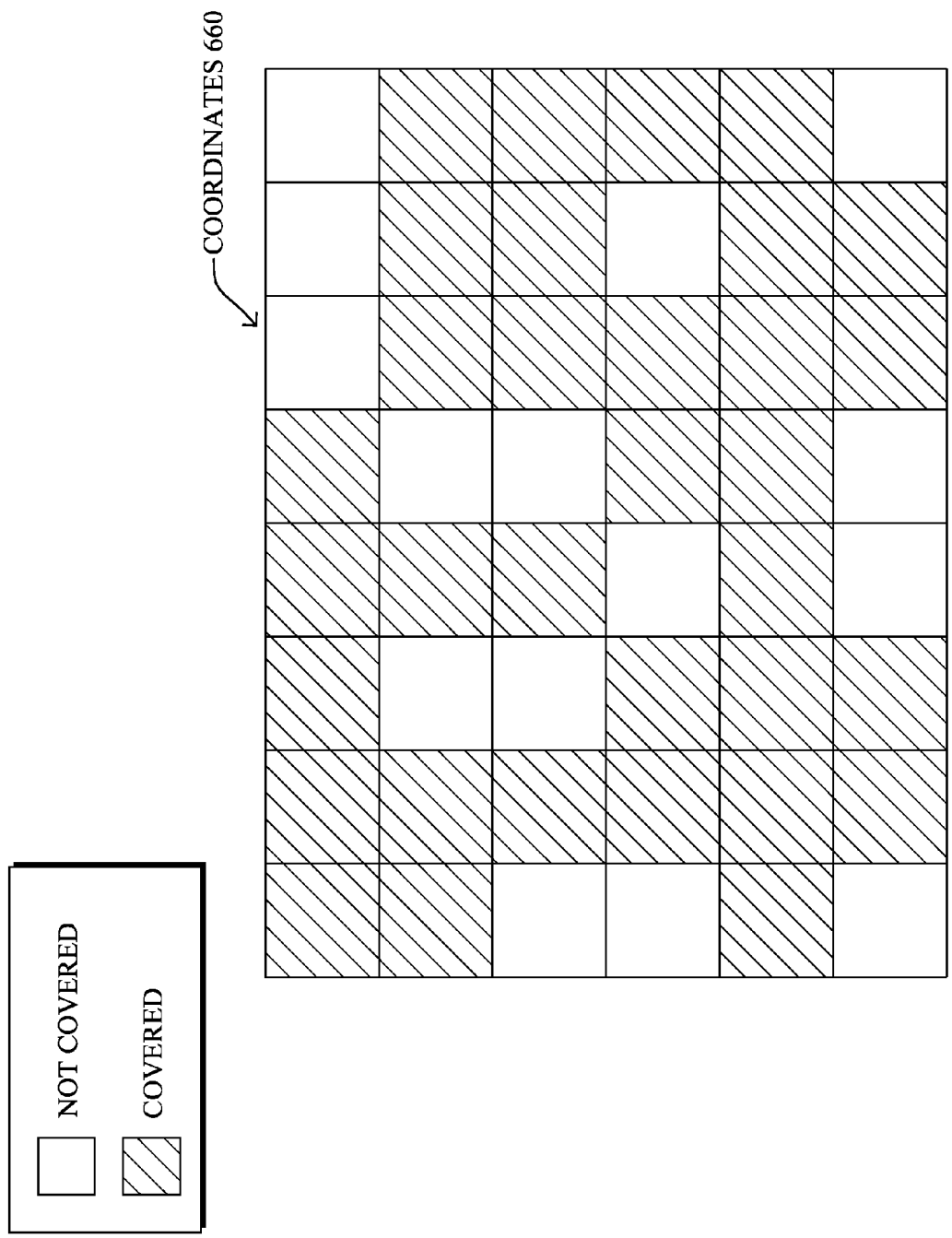
FIGS. 6A-6B illustrate example aggregation-based coordinates.

According to one or more alternative (or additional) embodiments, the aggregation of the capability messages 440 may also provide a more accurate view if position/location 526 and coverage information 528 are available. In particular, in these specific embodiments, where the capability messages 440 are augmented with coordinate information (physical location, relative location, network location, etc.), the capabilities may be aggregated into coordinates and/or coverage values in a variety of manners. For instance, as shown in FIG. 6A, the aggregation may indicate mapped coordinates 660 (based on field 526) of coverage for a particular capability within the computer network domain. For example, the domain/LLN may be mapped corresponding to a particular area, shape, etc. As such, if there is capability in a certain area (e.g., temperature sensing), then the aggregation may indicate those covered areas, e.g., as a bitmap or other suitable mapping technique.

Figure 6B:
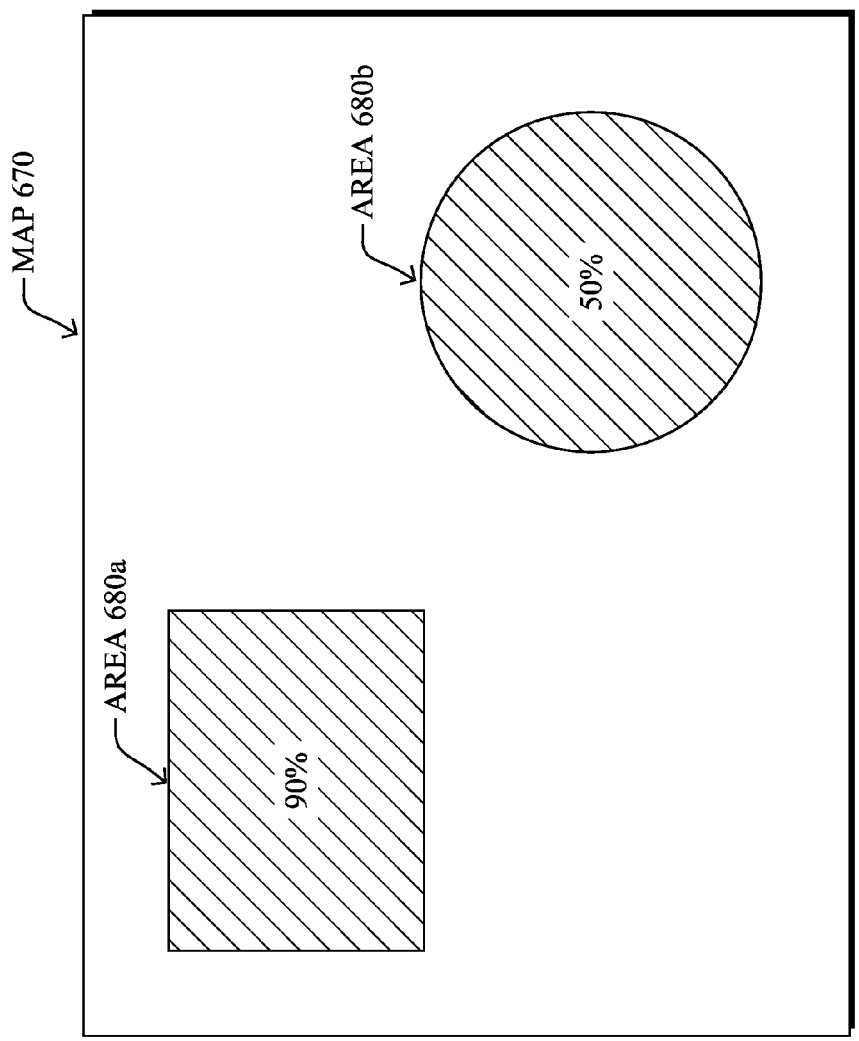

Alternatively (or in addition), as shown in FIG. 6B, the aggregation may indicate, within a larger map 670, one or more coverage areas 680 for a particular capability, along with a coverage percentage within that coverage area. That is, the capability messages 440 may allow for mapping of aggregated areas 680 consisting of coordinates within of the larger map 670 (e.g., rectangular area coordinates 680*a*, center/radius area coordinates 680*b*, etc.). The aggregation device may then provide the coordinates 526 of the covered area along with a percentage coverage 528. As an example, such aggregated information may thus relay that a particular capability, e.g., temperature sensing, is available in the area 680 having coordinates (e.g., of a rectangle, circle, etc.) with a particular coverage value (e.g., 90% coverage, 50% coverage, etc.). The actual coverage values may be computed based on received capability information regarding the location and range of the capability, as noted above.

Figure 7:
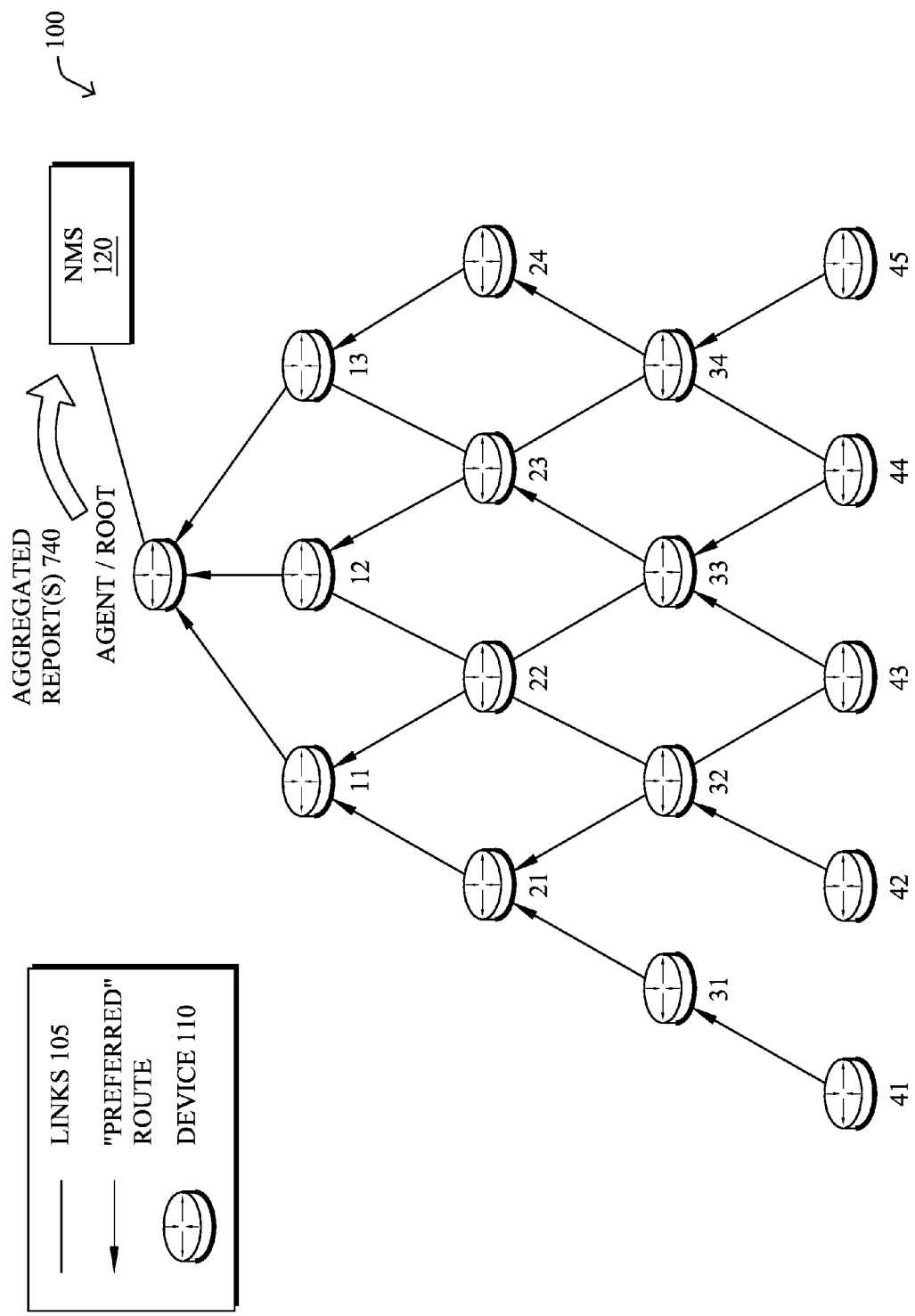
FIG. 7 illustrates an example aggregation report exchange.

According to the techniques herein, and as illustrated in FIG. 7, the aggregated reports 740 (aggregated device capabilities) are provided from the aggregation device(s) to the central agent in NMS 120, which is located outside of the computer network domain (e.g., over a backhaul link, a WAN, a wireless connection, 3G links, etc.). It is worth pointing out that the connection between LBRs and the central agent (thus to the "classic IP" network) is usually very constrained in terms of bandwidth, and as such, the aggregation of the potentially large number of capability messages 440 may be particularly beneficial. From the received reports 740, the NMS 120 may then keep track of all network domains and their respective capabilities based on the aggregated information.

Updates to the aggregated reports (aggregated device capabilities) 740 may be sent from the aggregation device(s) to the NMS 120 whenever a new capability is determined/registered, or when certain values change over time. In a specific embodiment, the updates may be transmitted according to low-pass filtering with hysteresis to only send incremental changes to the NMS 120 in case of significant changes, thus limiting the control traffic between the LBRs and the central agent.

Notably, when reports are related to network statistics (link or local nodes) as opposed to node capabilities, local rules may be used by the aggregation device so as to filter out or aggregate information, and send notifications to the central agent hosted on the NMS 120, e.g., optionally in the event certain filtering thresholds are crossed. In other words, upon receiving network statistics from one or more of the devices in the computer network domain (e.g., a type of message 440, not separately shown), the aggregation device may correspondingly aggregate the network statistics, and provide them to the management device (NMS 120). In one specific embodiment, in particular, particular statistics may be provided in response to that particular statistic crossing a configured threshold.

Figure 8:
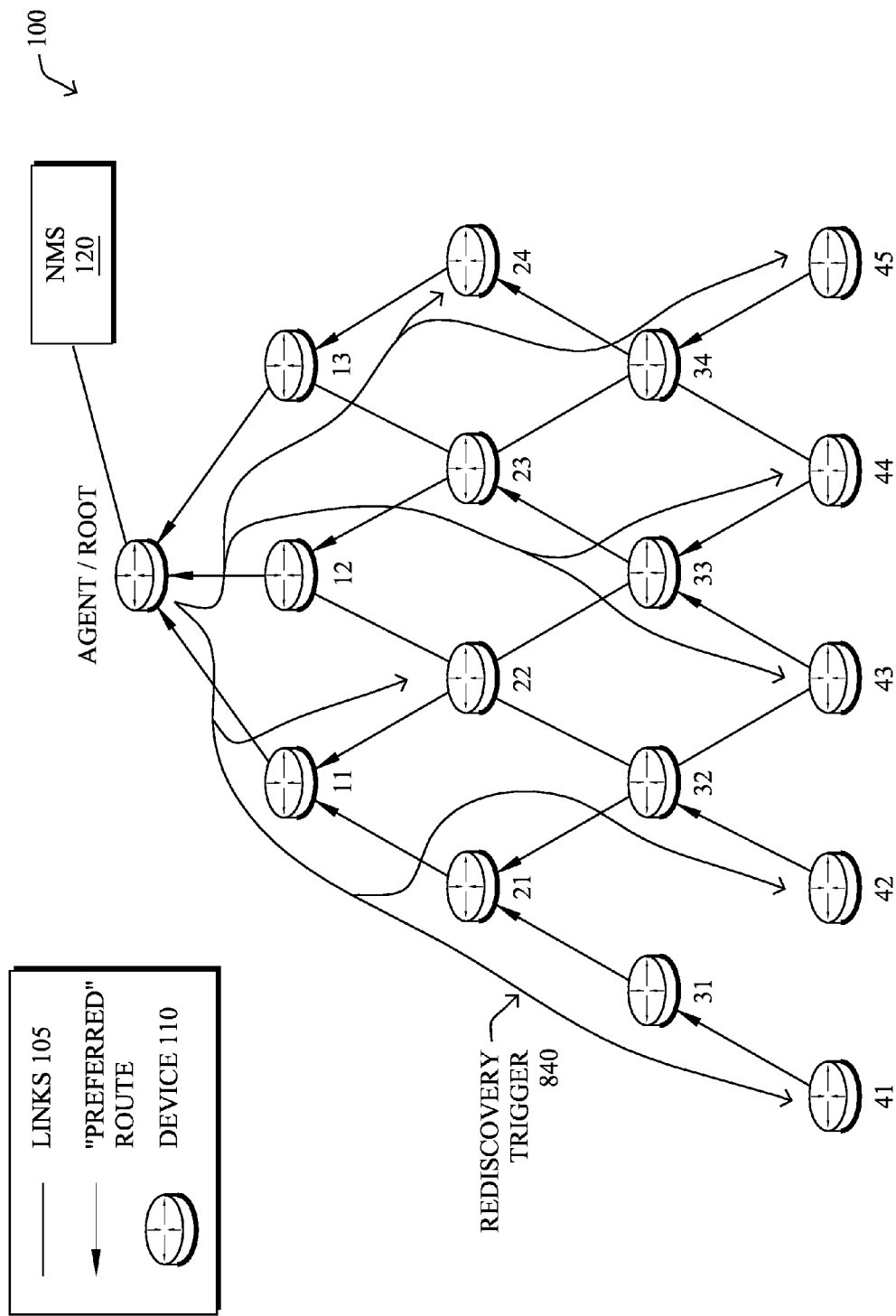
FIG. 8 illustrates an example rediscovery trigger.

In yet another embodiment, the aggregation device may be configured to periodically trigger a capability rediscovery. In particular, the aggregation device may first determines whether the network traffic in the network domain is sufficiently low (e.g., below a configured threshold during a low traffic period) to thus avoid interfering with data traffic. As shown in FIG. 8, therefore, the aggregation device may trigger a capability rediscovery (trigger 840) within the computer network domain, particularly in response to the network traffic being below the configured threshold. Upon receiving this trigger 840, the devices 110 may then send updated/refreshed capability reports 440 (e.g., as shown in FIG. 440). Note that while the trigger 840 is shown as a generally distributed message, in certain embodiments the trigger 840 may be sent to specific devices or specific types of devices.

Figure 9:
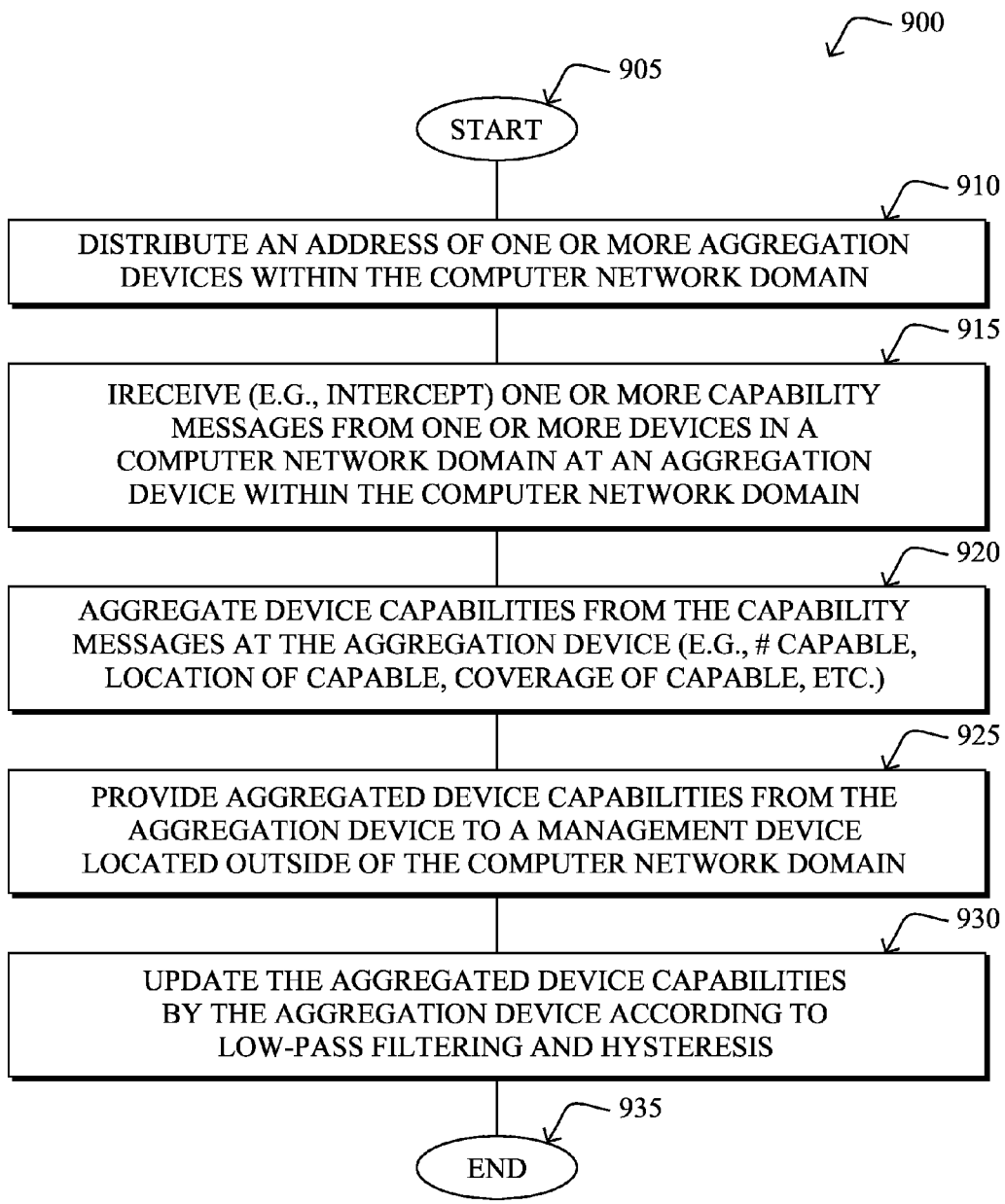
FIG. 9 illustrates an example simplified procedure for providing a hierarchal scheme for aggregated views of device capabilities in a computer network.

FIG. 9 illustrates an example simplified procedure for providing a hierarchal scheme for aggregated views of device capabilities in a computer network in accordance with one or more embodiments described herein. The procedure 900 may start at step 905, and continues to step 910, where, as described in greater detail above, an address of one or more aggregation devices (e.g., LBRs) may optionally be distributed to the devices 110 within the computer network domain. As such, in step 915, an aggregation device may receive (or intercept) one or more capability messages 440 from the devices, and as detailed above, may aggregate the device capabilities from the capability messages at the aggregation device in step 920 (e.g., indicating a number capable, a location of capable devices, coverage of capabilities, etc.). In step 925, the aggregation device may then provide aggregated device capabilities 740 to a management device located outside of the computer network domain (e.g., NMS 120). Note that whenever updates are merited, the aggregation device may update the aggregated device capabilities in step 930, e.g., according to low-pass filtering and hysteresis, as described above. The illustrative simplified procedure 900 may then end in step 935, notably with the ability to continue to receive new capability messages, new updates, etc.

Figure 10:
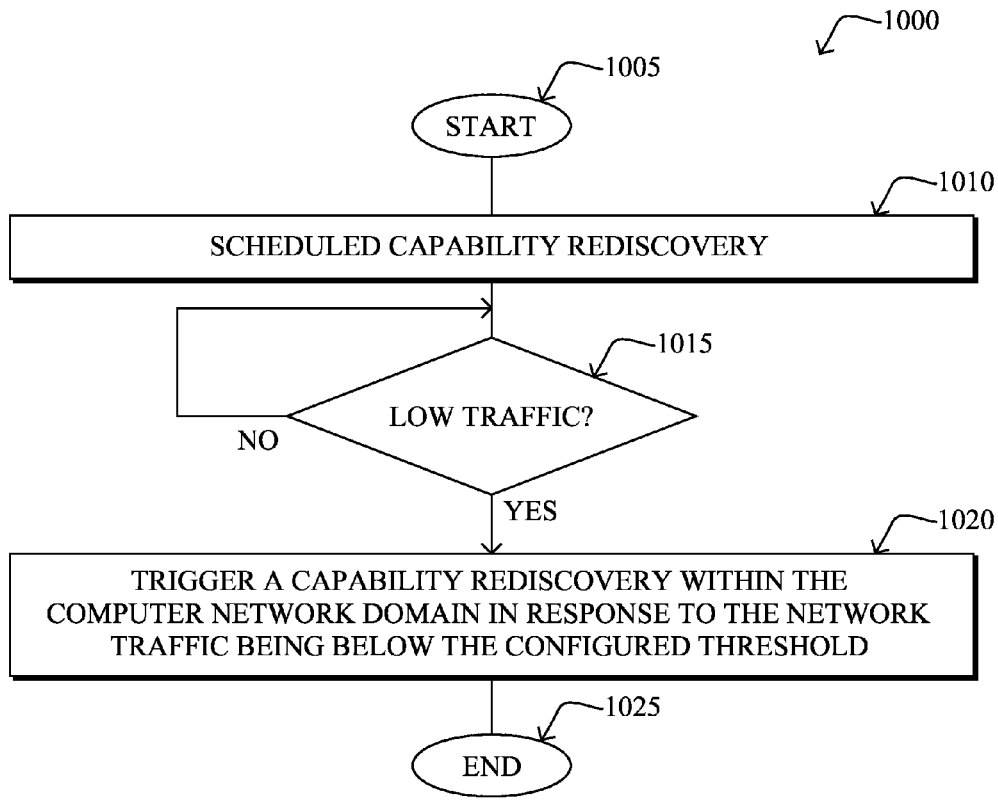
FIG. 10 illustrates another example simplified procedure for providing a hierarchal scheme for aggregated views of device capabilities in a computer network, particularly for capability rediscovery.

Additionally, FIG. 10 illustrates another example simplified procedure for providing a hierarchal scheme for aggregated views of device capabilities in a computer network in accordance with one or more embodiments described herein, particularly for capability rediscovery. That is, the procedure 1000 may start at step 1005, and continues to step 1010, where, as described in greater detail above, the aggregation device may be configure to perform scheduled capability rediscovery. As such, in response to determining that network traffic within the computer network domain is below a configured threshold in step 1015, then in step 1020 the aggregation device may correspondingly trigger a capability rediscovery within the computer network domain. The procedure 1000 may then end in step 1025, e.g., until another rediscovery is scheduled.

Figure 11:
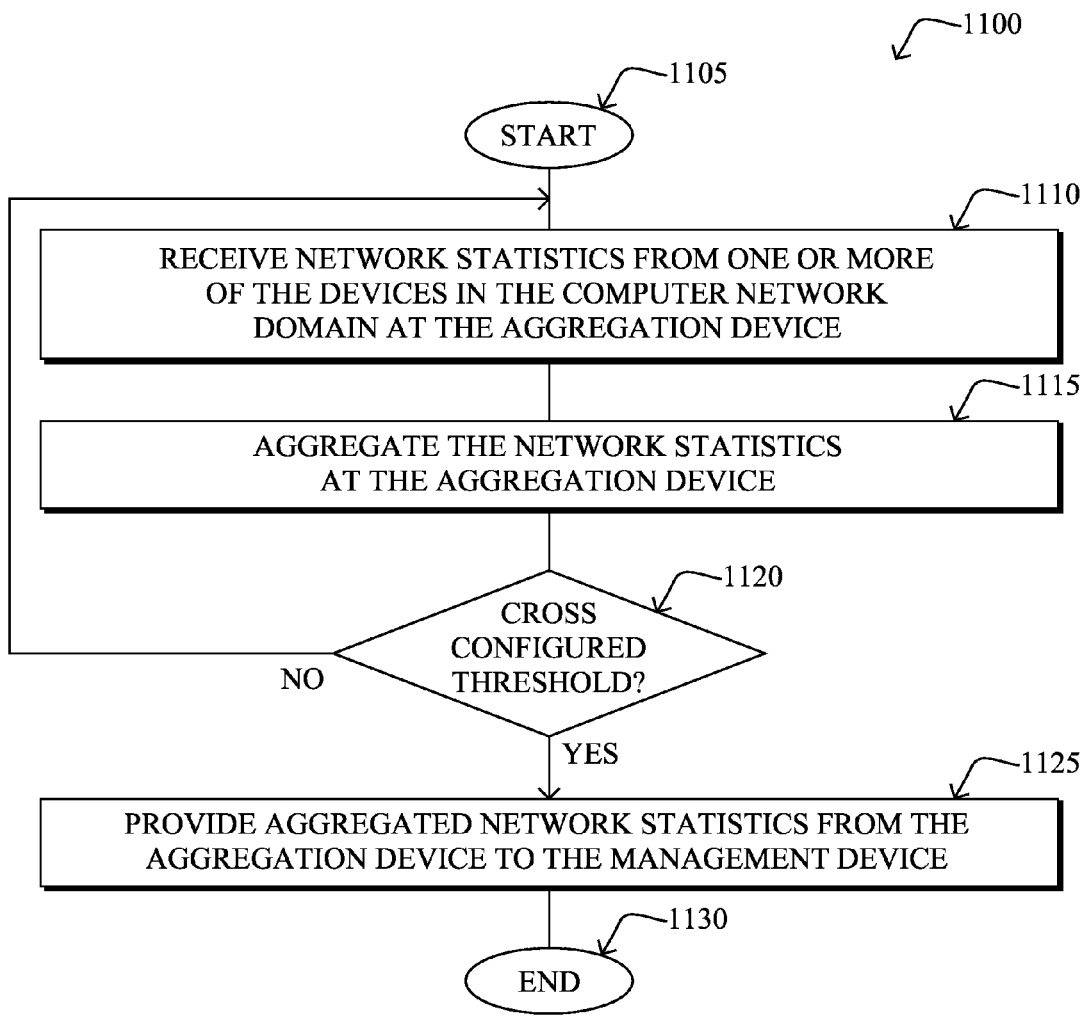
FIG. 11 illustrates another example simplified procedure for providing a hierarchal scheme for aggregated views of device capabilities in a computer network, particularly showing provisions for aggregating network statistics.

Lastly, FIG. 11 illustrates another example simplified procedure for providing a hierarchal scheme for aggregated views of device capabilities in a computer network in accordance with one or more embodiments described herein, particularly showing provisions for aggregating network statistics as well. The procedure 1100 may start at step 1105, and continues to step 1110, where, as described in greater detail above, network statistics may also be received by the aggregation device from one or more of the devices in the computer network domain. As such, in step 1115, the aggregation device may also aggregate the network statistics, and optionally when the statistics cross a configured threshold in step 1120, may then provide the aggregated network statistics to the management device in step 1125. The illustrative procedure 1100 may then end in step 1130.

It should be noted that while certain steps within procedures 900-1100 may be optional as described above, the steps shown in FIGS. 9-11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 900-1100 are described separately, certain steps from each procedure may be incorporated into each other procedure, and the procedures are not meant to be mutually exclusive.

The techniques described herein, therefore, provide for a hierarchal scheme for aggregated views of device capabilities in a computer network. In particular, the techniques herein increase the scalability of existing NMS architectures based on device-to-NMS information exchange, particularly reducing the amount of traffic between the network domain and the NMS, which is a major challenge in networks such as LLNs, where the LBR is connected to the NMS via constrained links such as 3G connections.

While there have been shown and described illustrative embodiments that provide for a hierarchal scheme for aggregated views of device capabilities in a computer network, it is to be understood that various other adaptations and modifications may be made within the spirit and scope of the embodiments herein. For example, the embodiments have been shown and described herein with specific relation to LLNs. However, the embodiments in their broader sense are not as limited, and may, in fact, be used with other types of networks. In addition, while certain protocols are shown, such as CoAP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a root node acting as an aggregation device for a management device, one or more capability messages and network statistics from each device of a plurality of devices making up the computer network domain;
   aggregating, by a processor on the aggregation device, device capabilities included in the capability messages into an aggregation report at the aggregation device, the aggregate report creating an aggregate view of the device capabilities of the plurality of devices in the computer network domain, the aggregate view organized according to each of type of device capability of the device capabilities associated with each device of the plurality of devices;
   aggregating, by the processor on the aggregation device, the network statistics;
   providing, by the processor on the aggregation device, the aggregation report to the management device located outside of the computer network domain;
   providing, by the processor on the aggregation device, aggregated network statistics from the aggregation device to the management device;
   updating the aggregated device capabilities and network statistics of the one or more devices at the management device by only sending incremental changes to the management device in order to limit control traffic sent to the management device;
   determining that network traffic within the computer network domain is below a configured threshold; and
   triggering a capability rediscovery within the computer network domain in response to the network traffic being below the configured threshold.

2. The method as in claim 1, further comprising:
   providing a particular aggregated network statistic in response to the particular aggregated network statistic crossing a configured threshold.

3. The method as in claim 1, wherein aggregating comprises:
   indicating that at least one device within the computer network domain has a particular capability.

4. The method as in claim 1, wherein aggregating comprises:
   indicating a number of devices within the computer network domain that have a particular capability.

5. The method as in claim 1, wherein aggregating comprises:
   indicating mapped coordinates of coverage for a particular capability within the computer network domain.

6. The method as in claim 1, wherein aggregating comprises:
indicating a coverage area for a particular capability and a coverage percentage within that coverage area.

7. The method as in claim 1, further comprising:
distributing an address of one or more aggregation devices within the computer network domain.

8. The method as in claim 7, further comprising:
including the address of the one or more aggregation devices within a dynamic host configuration protocol (DHCP) response.

9. The method as in claim 1, wherein the device capabilities include one or more of model; serial number; geographic location; hardware description; network interface description; sensing interface description; or sensing data coverage area.

10. The method as in claim 1, wherein the aggregation device is an edge device for the computer network domain.

11. The method as in claim 1, wherein the one or more capability messages are destined for the management device, and wherein receiving the one or more capability devices comprises intercepting the one or more capability messages by the aggregation device on their way toward the management device.

12. The method as in claim 1, wherein the one or more capability messages are based on a constrained application protocol (CoAP).

13. An apparatus, comprising:
one or more network interfaces to communicate within a computer network domain and with a management device outside of the computer network domain;
a processor coupled to the network interfaces and adapted to execute one or more processes; and
a memory configured to store a process executable by the processor, the process when executed operable to:
receive one or more capability messages and network statistics from a device of a plurality of devices making up the computer network domain, wherein the apparatus is a root device of the device of a plurality of devices in the computer network domain, the root device acting as an aggregation device for a management device;
aggregate device capabilities included in the capability messages into an aggregation report that creates an aggregate view of the device capabilities of the plurality of devices in the computer network domain, the aggregate view organized according to each of type of device capability of the device capabilities associated with each device of the plurality of devices;
aggregating the network statistics;
provide the aggregation report to the management device located outside of the computer network domain;
provide aggregated network statistics to the management device;
update the aggregated device capabilities and network statistics of the one or more devices at the management device by only sending incremental changes to the management device to limit control traffic sent to the management device;
determine that network traffic within the computer network domain is below a configured threshold; and
trigger a capability rediscovery within the computer network domain in response to the network traffic being below the configured threshold.

14. The apparatus as in claim 13, wherein the process when executed to aggregate is further operable to:
indicate that at least one device within the computer network domain has a particular capability.

15. The apparatus as in claim 13, wherein the process when executed to aggregate is further operable to:
indicate mapped coordinates of coverage for a particular capability within the computer network domain.

16. The apparatus as in claim 13, wherein the apparatus is an edge device for the computer network domain.

17. The apparatus as in claim 13, wherein the one or more capability messages are destined for the management device, and wherein the process when executed to receive the one or more capability devices is further operable to:
intercept the one or more capability messages on their way toward the management device.

18. A tangible, non-transitory, computer-readable media having software encoded thereon, the software, when executed by a processor on root node in a computer network domain acting as an aggregation device for a management device, operable to:
receive one or more capability messages and network statistics from each device of a plurality of devices making up the computer network domain;
aggregate device capabilities included in the capability messages into an aggregation report that creates an aggregate view of the device capabilities of the plurality of devices in the computer network domain, the aggregate view organized according to each of type of device capability of the device capabilities associated with each device of the plurality of devices;
aggregating the network statistics;
provide the aggregation report to the management device located outside of the computer network domain;
provide aggregated network statistics to the management device;
update the aggregated device capabilities and network statistics of the one or more devices at the management device by only sending incremental changes to the management device in order to limit control traffic sent to the management device;
determine that network traffic within the computer network domain is below a configured threshold; and
trigger a capability rediscovery within the computer network domain in response to the network traffic being below the configured threshold.

* * * * *